United States Patent
Maeda et al.

(10) Patent No.: US 10,501,266 B2
(45) Date of Patent: Dec. 10, 2019

(54) SILENT SPIRAL CONVEYOR

(71) Applicant: TOKYO SEIMITSU HATSUJO CO.,LTD., Yokohama (JP)

(72) Inventors: Takaaki Maeda, Yokohama (JP); Sugihide Nakashima, Yokohama (JP)

(73) Assignee: TOKYO SEIMITSU HATSUJO CO., LTD., Kanagawa (JP)

( * ) Notice: Subject to any disclaimer, the term of this patent is extended or adjusted under 35 U.S.C. 154(b) by 0 days.

(21) Appl. No.: 16/311,767

(22) PCT Filed: Jun. 21, 2017

(86) PCT No.: PCT/JP2017/022925
§ 371 (c)(1),
(2) Date: Dec. 20, 2018

(87) PCT Pub. No.: WO2017/221995
PCT Pub. Date: Dec. 28, 2017

(65) Prior Publication Data
US 2019/0168970 A1 Jun. 6, 2019

(30) Foreign Application Priority Data
Jun. 22, 2016 (JP) .................. 2016-123941

(51) Int. Cl.
*B65G 33/04* (2006.01)
*B65G 33/00* (2006.01)
*B23Q 11/00* (2006.01)

(52) U.S. Cl.
CPC .............. *B65G 33/04* (2013.01); *B23Q 11/00* (2013.01); *B23Q 11/0042* (2013.01)

(58) Field of Classification Search
None
See application file for complete search history.

(56) References Cited

U.S. PATENT DOCUMENTS

| 4,266,830 A * | 5/1981 | Retka ...................... E21B 10/44 |
| | | 173/DIG. 2 |
| 5,214,883 A * | 6/1993 | Naumec ................ B24B 31/067 |
| | | 451/326 |
| 8,739,963 B2 * | 6/2014 | Nickerson .............. B65G 33/34 |
| | | 198/604 |

FOREIGN PATENT DOCUMENTS

| JP | 2008-44046 A | 2/2008 |
| JP | 2012-61588 A | 3/2012 |

(Continued)

*Primary Examiner* — Kavel Singh
(74) *Attorney, Agent, or Firm* — Tutunjian & Bitetto, P.C.

(57) ABSTRACT

A spiral conveyor having a novel structure that is adapted to handle any chip while having a simple structure and is capable of achieving low vibration and low noise is provided. A tray for a spiral conveyor is configured from an outer tray, an inner tray which is placed over the inside of the outer tray, and a vibration damping material which is interposed between the outer tray and the inner tray. The tray has a fixing means for detachably fixing the inner tray and the vibration damping material to the outer tray on the outside of a conveyance spiral casing. The vibration damping material may be a single vibration damping material which is continuous over substantially all of the area between the outer tray and the inner tray, or may alternatively be arranged so as to be separated into a lower vibration damping material that is provided in a noise generation area with which a conveyance spiral is brought into contact and upper vibration damping materials that are provided in a noise propagation area including the fixed portion.

6 Claims, 9 Drawing Sheets

(56) References Cited

FOREIGN PATENT DOCUMENTS

| JP | 2013-244571 A | 12/2013 |
|---|---|---|
| JP | 2015-217506 A | 12/2015 |

\* cited by examiner

SILENT SPIRAL CONVEYOR

FIELD OF INVENTION

The present invention relates to a spiral conveyor and more particularly to a silent spiral conveyor having a novel structure that is adapted to handle any chip of various shapes, sizes and materials and capable of achieving low vibration and low noise.

BACKGROUND ART

As shown in Non-Patent Document 1 http://www.to-hatsu.cojp/products/sc_built.html and in FIG. 1, a spiral conveyor 1 is so designed that a conveyance spiral member 3 like a coil spring is received in a tray 2 and driven by a drive means 4 including a motor with a deceleration mechanism to be rotated at a low speed in a predetermined direction, thereby conveying chips 5 thrown into the tray 2 in a predetermined direction within the tray 2, while doing solid-liquid separation, which are then discharged toward a discharge duct 6 connected to the tray 2. Cutting fluid 7 is thrown into the tray 2 together with the chips 5, which will fall by gravity during conveyance to be separated from the chips and collected in a cutting fluid tank 8 positioned beneath the tray 2. Such spiral conveyor has been widely used in various machine tools, because it is capable of smoothly conveying chips having various shapes, sizes and materials, from largely-expanded long-chain-shaped continuous chips to needle-like fine chips, it has a simple structure and may be manufactured and provided at a low cost, it will achieve smooth conveyance while preventing the chips from being clung or entangled with each other, it will achieve long-distance conveyance of the chips in a process system wherein various machine tools are connected to each other, it is possible to efficiently separate and collect the cutting fluid adhered to the chips, etc.

PRIOR ARTS

Non-Patent Documents

Non-Patent Document 1:http://www.to-hatsu.co.jp/products/sc_built.html

SUMMARY OF INVENTION

Problems to be Solved by Invention

Representative types of the conventional machine tools are known as machining centers (numerical control machine tools having automatic tool changer) and NC lathes, but in recent years, machine tools referred to as so-called multi-function machines (or combined machining apparatus) having functions of both types have become prevailing. They include, for example, milling-base machines to which lathe function is incorporated and lathe-base machine to which milling function is incorporated. Such multifunction machines will produce cutting chips from machining and lathe chips from turning (these kinds of chips are referred to generally as "chips" hereinlater). A mixture of various chips of any shapes from continuous one to short chips will be discharged from such machines.

Titanium is known as a representative new material having a weight half of iron and a quadruple strength, which has become widely used as parts of aircrafts and automobiles. However, titanium is a material hard to be machined. In addition, machining of titanium will produce viscous chips. Further, increase of the conveyance speed and improvement of tools allows machining of high hardness material which has been recognized not to be machined by the conventional machining. Machining of the high hardness material will produce sharp and hard chips. When such chips should be conveyed by the conventional spiral conveyors, the conveyance spiral member and the tray would easily be damaged to a greater extent by abrasion, which makes it necessary to take some counterplan to cope with this problem. In the conventional spiral conveyors, when the tray becomes worn, it must be replaced with another as a whole, which increases the cost.

Furthermore, it is known that one of the few disadvantages of the spiral conveyors is a high noise during conveyance, but this has been recognized to be an inevitable defect resulting from its structure. However, when the combined chips of different materials discharged randomly from the multifunctional machines or the sharp and hard material chips are to be conveyed by the spiral conveyors, it should generate much greater noise. To cope with this problem, there will be an increasing demand to provide a fundamental measure capable of drastically lowering the noise level Accordingly, the problem to be solved by the present invention is, based on consideration of the above-described backgrounds, to provide a silent spiral conveyor having a novel structure that is adapted to handle various chips of any shape and any hardness with a simple structure, which is capable of achieving low vibration and low noise.

Means for Solving the Problems

To solve these problems, according to claim 1 of the present invention, there is provided a silent spiral conveyor wherein a coil-spring like conveyance spiral member is received in a tray and driven by a drive means such as a motor with a deceleration mechanism to be rotated at a low speed in a predetermined direction, thereby conveying chips thrown into the tray in a predetermined direction within the tray, characterized in that the tray comprises an outer tray, an inner tray placed inside of the outer tray, a vibration dampening material interposed between the outer tray and the inner tray, and a fixing means for detachably fixing the inner tray and the opposite ends of the first vibration dampening material to the outer tray.

According to claim 2 of the present invention, in the silent spiral conveyor of claim 1, it is characterized in that the first vibration dampening material extends continuously between the outer tray and the inner tray, over substantially the entire areas including the opposite end portions thereof fixed by the fixing means.

According to claim 3 of the present invention, in the silent spiral conveyor of claim 1, it is characterized in that, wherein a pair of projecting rails extend in a direction of conveyance at two opposite-angle positions with respect to a center line of the inner tray for substantially supporting the conveyance spiral member, the first vibration dampening material is divided into an arcuate lower vibration dampening material interposed between the outer tray and the inner tray over an area covering the center line and the rails, and a pair of planar upper vibration dampening materials interposed between the outer tray and the inner tray at the opposite end portions thereof fixed by the fixing means.

According to claim 4 of the present invention, in the silent spiral conveyor of any one of claims 1-3, it is characterized in that the fixing means includes a second vibration dampening means for preventing vibration of the inner tray from being transmitted to the outer tray, when it combines integrally the outer tray and the inner tray with each other with the first vibration dampening material being interposed therebetween.

According to claim 5 of the present invention, in the silent spiral conveyor of claim 4, it is characterized in that the fixing means comprises a screw extending successively through the outer tray, the first vibration dampening means and the inner tray, and a nut that fastens the screw outside of the outer tray, wherein the second vibration dampening means is disposed in an area of contact of the nut and the screw.

According to claim 6 of the present invention, in the silent spiral conveyor of any one of claims 1-3, it is characterized in that the fixing means comprises a presser plate having one end being fixed by a fastening means to the outer tray outside of the end portion of the inner tray, the presser plate working as a leaf spring so that the end portion of the inner tray is inserted between the leading end of the presser plate and the outer tray for detachable mounting of the inner tray, and the second vibration dampening means is disposed between the leading end of the presser plate and the end portion of the inner tray.

Advantages of Invention

In accordance with the present invention defined in claim 1, the inner tray and the vibration dampening material are detachable with respect to the outer tray, so that when the inner tray is damaged by abrasion due to contact with the chips, the inner tray may be removed for repairment or exchange, which reduces the costs and improves maintainability. The vibration dampening material may also be exchanged at any time when the function-reduced one needs to be replaced by another one or it should be replaced by another material one.

Further, the outer tray and the inner tray may be held out of contact with each other by the first vibration dampening material interposed therebetween. This will effectively suppress vibration of the inner tray which may be caused by contact with the chips during conveyance of the chips by the rotating conveyance spiral member. Such vibration is prevented from being transmitted to the outer tray, thereby drastically lowering the noise generation resulting from the vibration.

In accordance with the present invention defined in claim 2, an embodiment is provided wherein the first vibration dampening material is placed between the outer tray and the inner tray over the entire areas including the opposite end portions thereof where they are fixed by the fixing means. In this embodiment, it is also possible to drastically lower the vibration-derived noise generation.

In accordance with the present invention defined in claim 3, another embodiment is provided wherein the first vibration dampening material is divided into the lower vibration dampening material interposed between the outer tray and the inner tray over an area centered at the center line and at least including a pair of rails, and the upper vibration dampening materials interposed between the outer tray and the inner tray at the front end portions thereof fixed by the fixing means. In this embodiment, it is also possible to drastically lower the vibration-derived noise generation.

In accordance with the present invention defined in claim 4, a second vibration dampening material is provided for preventing vibration of the inner tray from being transmitted to the outer tray, when it combines integrally the outer tray and the inner tray with each other with the first vibration dampening material being interposed therebetween, which will more effectively suppress the vibration and noise generation.

In accordance with the present invention defined in claim 5, there is provided another embodiment wherein a screw/nut assembly is used as the fixing means. The screw extends successively through the outer tray, the first vibration dampening material and the inner tray, and the nut is to fasten the screw outside of the outer tray. If they should be in contact with the outer tray and the inner tray, vibration of the inner tray would be transferred to the outer tray via the contact point. This can be prevented by the second vibration dampening material, which will more effectively suppress the vibration and noise generation.

In accordance with the present invention defined in claim 6, there is provided another embodiment wherein a presser plate acting as a leaf spring is used as the fixing means. In accordance with this embodiment, the third vibration dampening material interposed between the end portion of the inner tray and the leading end of the presser plate will prevent vibration of the inner tray from being transmitted not only to the outer tray but also to the presser plate. Thus, when the presser plate is secured to the outer tray, there is no need of consideration for the vibration dampening, which will allow use of fastening means such as a normal screw/nut assembly.

EMBODIMENTS OF INVENTION

The present invention will be described in detail in reference to some embodiments thereof.

Embodiment 1

Figure 1:
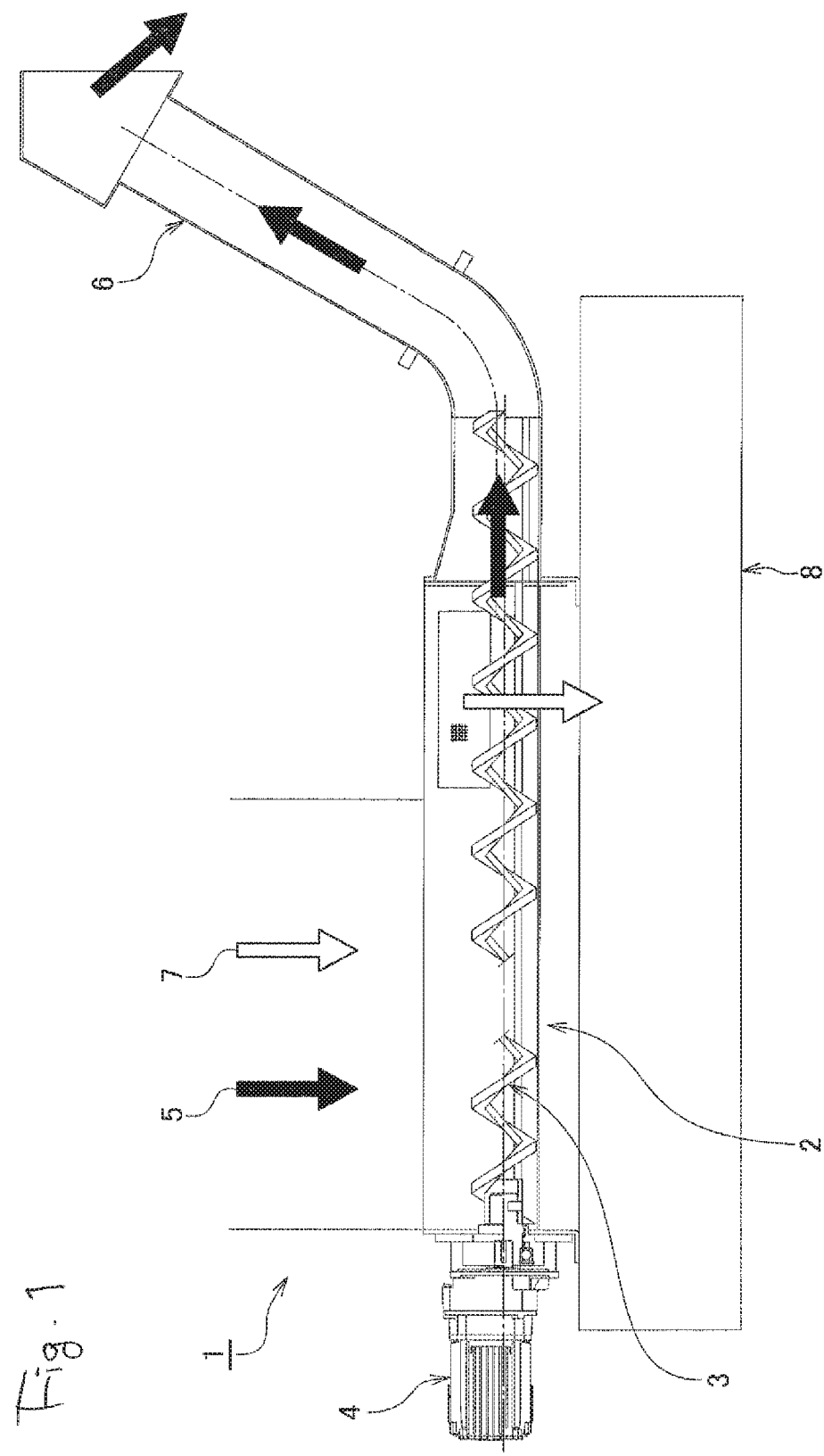
FIG. 1 a front view showing a basic structure of a spiral conveyor.
Figure 2:
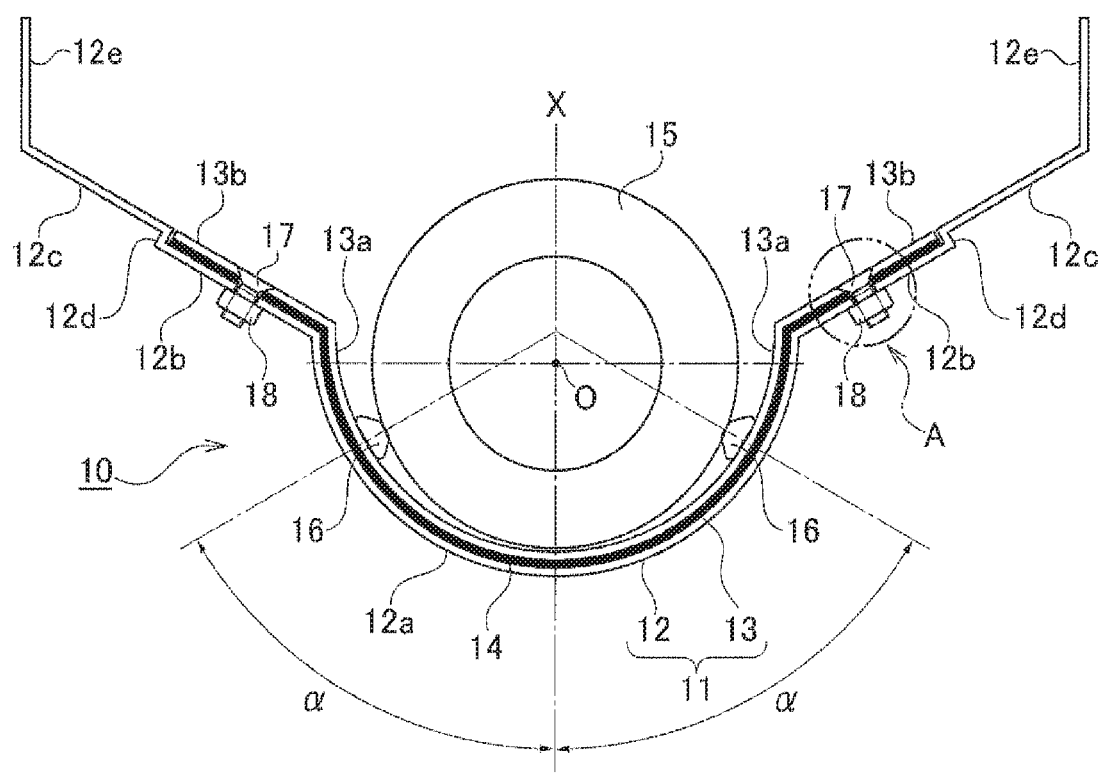
FIG. 2 a cross-section of a silent spiral conveyor according to an embodiment (Embodiment 1) of the present invention.
Figure 3:
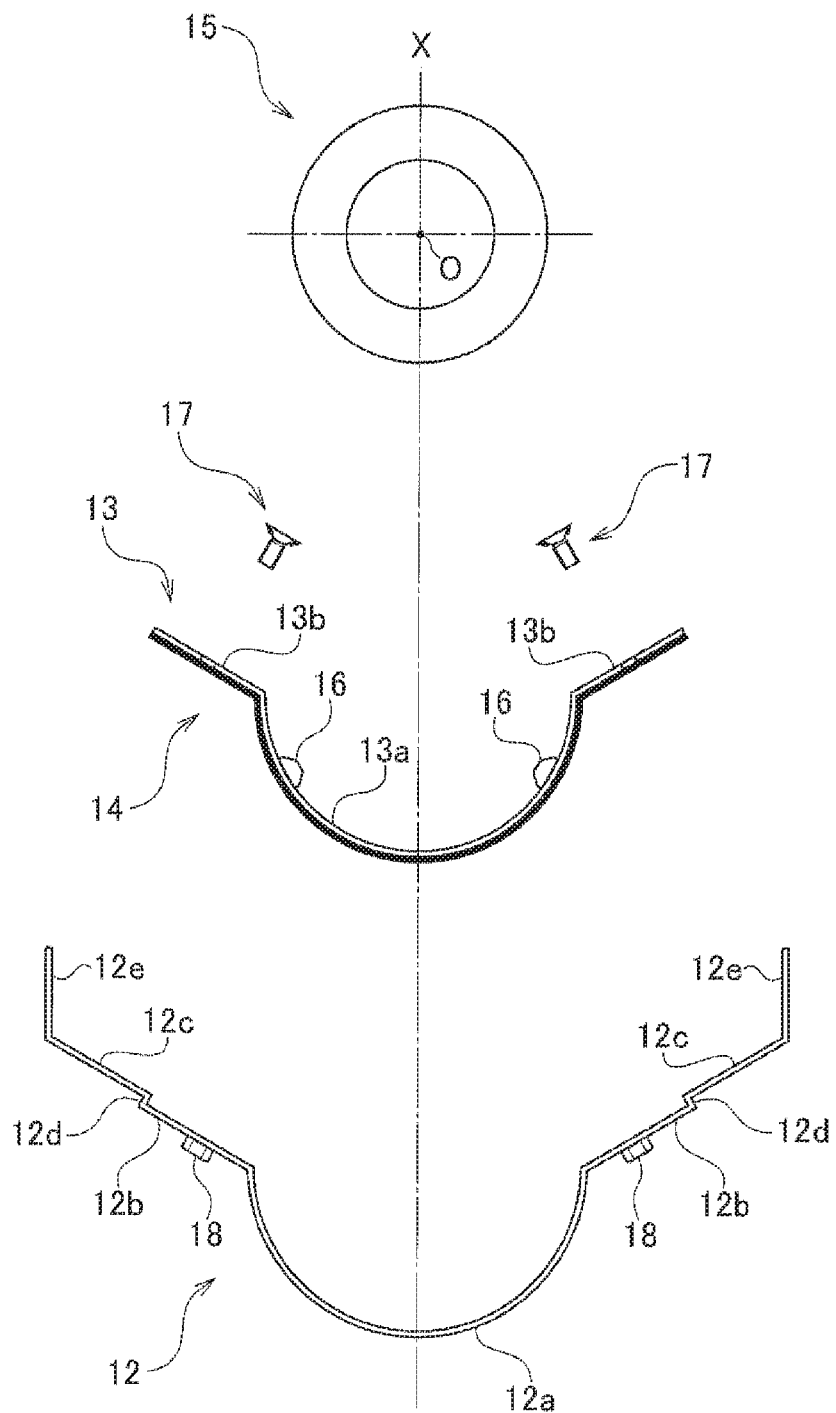
FIG. 3 a cross-section individually showing the respective parts of the silent spiral conveyor of FIG. 2.

A silent spiral conveyor (hereinlater referred to simply as "spiral conveyor") according to Embodiment 1 of the present invention will be described in reference to FIG. 2 and FIG. 3. This silent spiral conveyor 10 of Embodiment 1 has the same basic structure as the spiral conveyor 1 of FIG. 1 and its basic operation and function will also the same as having been described in connection with FIG. 1, but differs in that the tray 2 has a dual layered structure comprising an outer tray and an inner tray, and also in that it is designed to achieve vibration dampening and noise reduction. More specifically, a tray 11 of this spiral conveyor 10 has a dual layered structure comprising a fixedly mounted outer tray 12 and an inner tray 13 detachably mounted and layered over the inside of the outer tray 12, and a vibration dampening material 14 is interposed between the outer tray 12 and the inner tray 13. The spiral conveyor 10 has a symmetric design with respect to a cross-sectional center line X.

For more detailed explanation, the outer tray 12 is formed by bending a single metal plate to include a semi-circular cylindrical section 12a having substantially a semi-circular cross-section with a radius slightly larger than the outer diameter of a conveyance spiral member 15, inclined sections 12b, 12c extending upward and outward from the opposite ends of the semi-circular cylindrical section, bent-step sections 12d formed between the inclined sections 12b, 12c, and the vertical sections 12e upstanding from the leading ends of the inclined sections 12c. On the other hand, the inner tray 13 is formed by bending a single metal plate to include a semi-circular cylindrical section 13a having substantially a semi-circular cross-section with a radius almost equal to the semi-circular cylindrical section 12a of the outer tray, and inclined sections 13b extending upward and outward from the opposite ends of the semi-circular cylindrical section. The inclined sections 13b of the inner tray 13 have the extending length almost equal to or slightly smaller than the inclined sections 12b of the outer tray 12, so that, when the inner tray 13 is placed and layered over the interior of the outer tray 12 with the vibration dampening material 14 being interposed therebetween, the leading ends of the inclined sections 13b of the inner tray 13 do not reach the bent-step sections 12d of the outer tray 12.

The conveyance spiral member 15 is received within the semi-circular cylindrical section 13a of the inner tray 13. In this embodiment, rails 16, 16 are symmetrically secured at opposite two positions offset at an angle α from the center line X of the semi-circular cylindrical section 13a, so that the conveyance spiral member 15 is supported on the rails 16, 16, while maintaining the center O to be almost aligned on the center line X. In addition, there remains a small gap from the inner surface (the front surface) of the semi-circular cylindrical section 13a of the inner tray 13 to keep noncontact therewith. This arrangement does not directly relate to the subject matters of the present invention and, therefore, more detailed description is omitted.

The vibration dampening material 14 preferably comprises a rubber sheet such as NBR sheet, but its material is not limited as far as it achieves vibration dampening function. A vibration dampening coating material may be used as the vibration dampening material 14. In this embodiment, the vibration dampening material 14 formed as a sheet is attached to the inner tray 13 to form an integral body together with the inner tray 13 (FIG. 3). The vibration dampening materials 14 extends in a length sufficient to cover the entire length of the inner tray 13, which will keep the inner tray 13 out of contact with the outer tray 12 over the entire length. It further extends to cover the leading ends of the inner tray 13 as well, thereby keeping the leading ends out of contact with the bent-step section 12d of the outer tray 12.

In order that the inner tray 13 is designed to be exchangeable when abrasively worn, it should be detachably attached to the outer tray 12 with the vibration dampening material 14 being interposed between the inner tray 13 and the outer tray 12. In this embodiment, this detachable mounting is achieved by employing a countersunk head screw 17 extending successively through the inner tray inclined section 13b, the vibration dampening material 14 and the outer tray inclined section 12b, and a nut 18 secured to the underside of the outer tray inclined section 12b for fastening the countersunk head screw 17. Of course, the countersunk head screw 17 may be replaced by any one of various screws and bolts.

Embodiment 2

Figure 4:
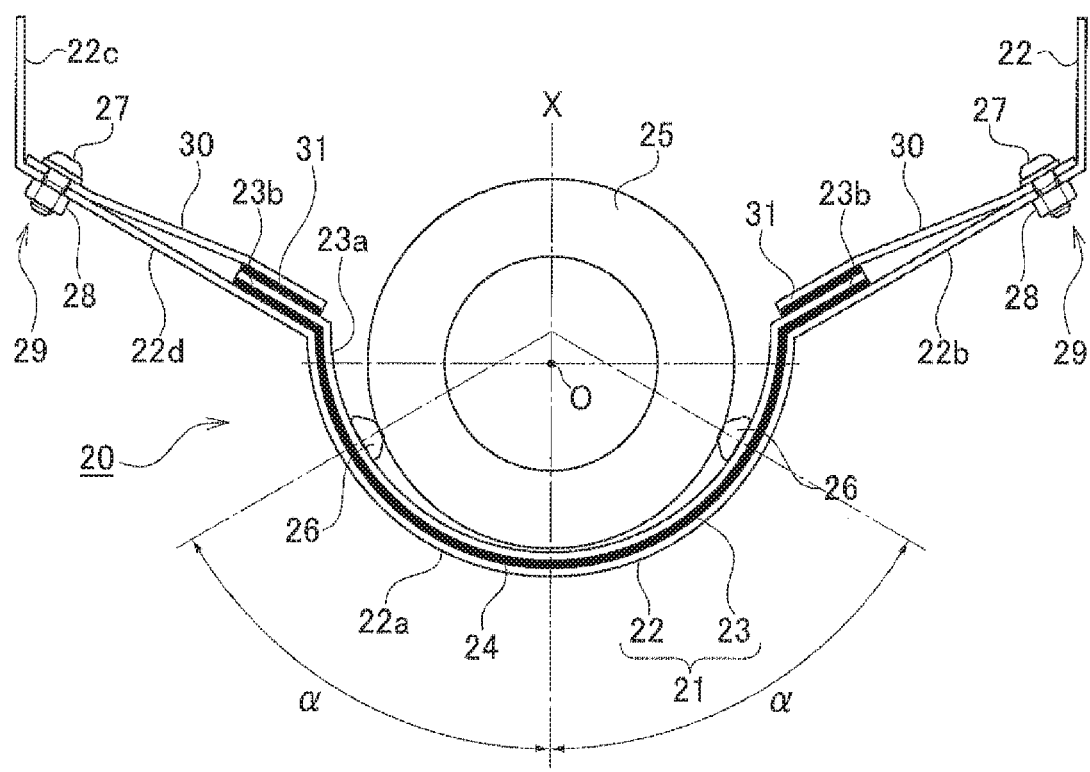
FIG. 4 a cross-section of a silent spiral conveyor according to another embodiment (Embodiment 2) of the present invention.
Figure 5:
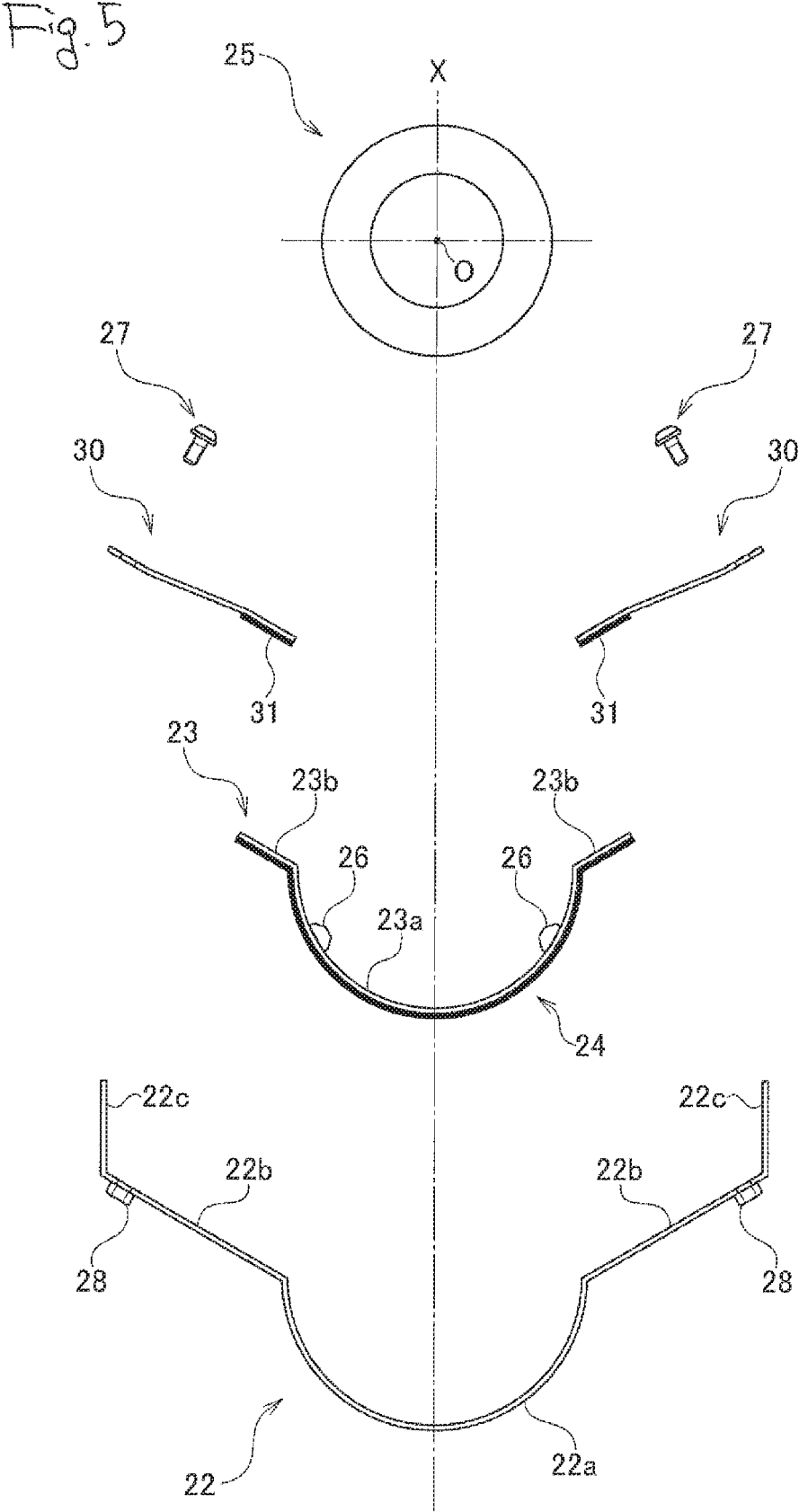
FIG. 5 a cross-section individually showing the respective parts of the silent spiral conveyor of FIG. 4.

A spiral conveyor according to Embodiment 2 of the present invention will be described in reference to FIG. 4 and FIG. 5. This spiral conveyor 20 of Embodiment 2 has the same basic structure as the spiral conveyor 1 of FIG. 1 and its basic operation and function will also the same as having been described in connection with FIG. 1, but differs in that the tray 2 has a dual layered structure comprising an outer tray and an inner tray, and also in that it is designed to achieve vibration dampening and noise reduction. More specifically, a tray 21 of this spiral conveyor 20 has a dual layered structure comprising a fixedly mounted outer tray 22 and an inner tray 23 detachably mounted and layered over the inside of the outer tray 22, and a vibration dampening material 24 is interposed between the outer tray 22 and the inner tray 23. The spiral conveyor 20 has a symmetric design with respect to a cross-sectional center line X.

For more detailed explanation, the outer tray 22 is formed by bending a single metal plate to include a semi-circular cylindrical section 22a having substantially a semi-circular cross-section with a radius slightly larger than the outer diameter of a conveyance spiral member 25, inclined sections 22b extending upward and outward from the opposite ends of the semi-circular cylindrical section 22a, and vertical sections 22c upstanding from the leading ends of the inclined sections 22b. On the other hand, the inner tray 23 is formed by bending a single metal plate to include a semi-circular cylindrical section 23a having substantially a semi-circular cross-section with a radius almost equal to the semi-circular cylindrical section 22a of the outer tray, and inclined sections 23b extending upward and outward from the opposite ends of the semi-circular cylindrical section 23a. The inclined sections 23b of the inner tray 23 have the extending length smaller than the inclined sections 22b of the outer tray 22.

As with the vibration dampening material 14 of Embodiment 1, the vibration dampening material 24 preferably comprises a rubber sheet such as NBR sheet, but it may be replaced by a vibration dampening coating material. In this embodiment, the vibration dampening material 24 formed as a sheet is attached to the inner tray 23 to form an integral body together with the inner tray 23 (HO). The vibration dampening materials 24 extends in a length sufficient to cover the entire length of the inner tray 23, which will keep the inner tray 23 away from contact with the outer tray 22 over the entire length. Further, as with Embodiment 1, rails 26 are secured at two opposite positions offset from the center line X of the semi-circular cylindrical section 23a of the inner tray 23.

In order that the inner tray 23 is designed to be exchangeable when abrasively worn, it should be detachably attached to the outer tray 22 with the vibration dampening material 24 being interposed between the inner tray 23 and the outer tray 22. In this embodiment, this detachable mounting is achieved by fastening presser plates 30 with fastening means 29 each comprising a screw 27 and a nut 28 (secured to the undersides of the outer tray inclined section 22b), near the leading ends of the inner tray inclined sections 23b. The presser plates 30 act as leaf springs for holding the inner tray inclined sections 23b between the leading ends thereof and the outer tray inclined sections 22b. In this design, if the leading ends of the presser plates 30 should be in direct contact with the inner tray inclined sections 23b, vibration of the inner tray 23 is transmitted to the outer tray 22 via the presser plates 30 and the fastening means 28, thereby degrading the silencing effect. This may be prevented by placing another vibration dampening material 31 between the leading ends of the presser plates 30 and the inner tray inclined sections 23b. The vibration dampening material 31 may be one similar to the vibration dampening material 24, which may be achieved by adhering a sheet-like vibration dampening material or coating a vibration dampening coating material.

In this embodiment, by employing the vibration dampening material 24 interposed between the outer tray 22 and the inner tray 23 and the vibration dampening materials 31 interposed between the leading ends of the presser plates 30 and the inner tray inclined sections 23b, the inner tray 23 will be kept, at any point, away from direct or indirect contact with the outer tray 22. Accordingly, no consideration about vibration dampening needs to be given to the fastening means 29 that fastens the presser plates 30 to the outer tray 22, and usual screws 27 and nuts 28 may be used.

Embodiment 3

Figure 6:
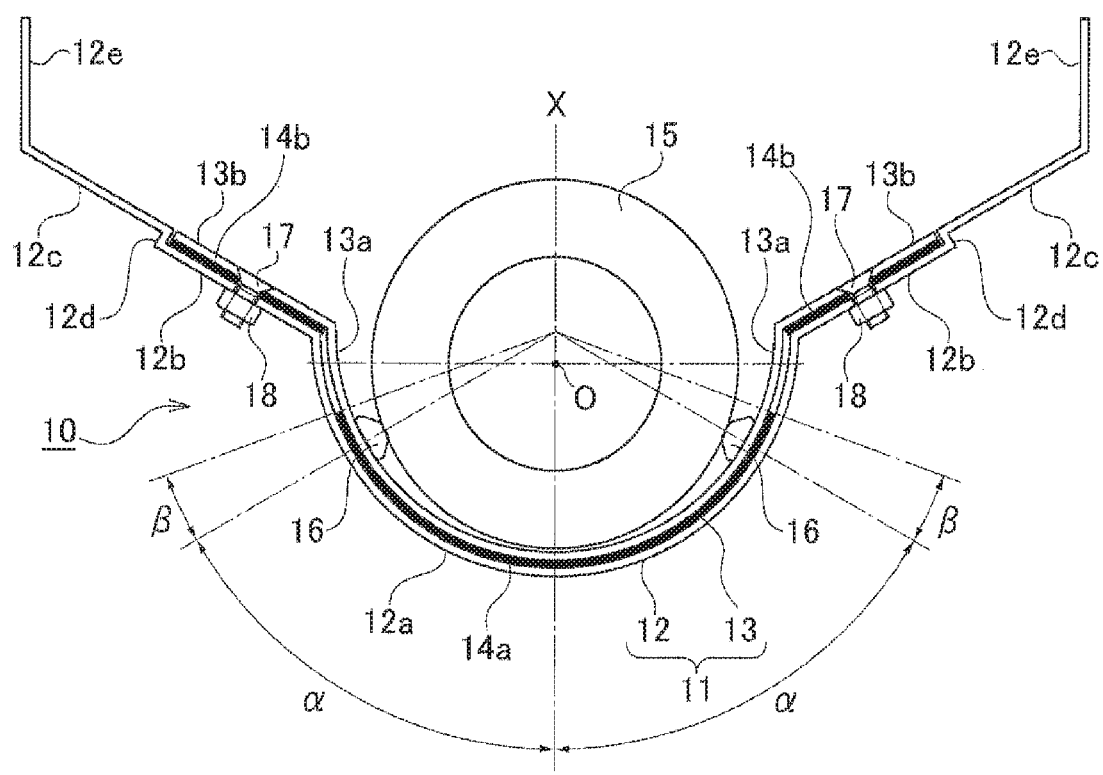
FIG. 6 a cross-section of a silent spiral conveyor according to another embodiment (Embodiment 3) of the present invention.

A spiral conveyor according to Embodiment 3 of the present invention will be described in reference to FIG. 6. This spiral conveyor 10A has the structure similar to the spiral conveyor 10 of Embodiment 1 and also is common in that the vibration dampening material 14 is interposed between the outer tray 12 and the inner tray 13. However, in the spiral conveyor 10 of Embodiment 1, the vibration dampening material 14 covers the entire areas (including the semi-circular cylindrical section 13a and the inclined sections 13b) of the inner tray 13 which also includes the portions fixed by the screw 17 and the nut 18, whereas the vibration dampening material 14 in the spiral conveyor 10A of Embodiment 3 is divided into an arcuate lower vibration dampening material 14a interposed between the outer tray 12 (more specifically, the semi-circular cylindrical section 12a thereof) and the inner tray 13 (more specifically, the semi-circular cylindrical section 13a thereof) over an area covering the center line X and a pair of rails 16, 16 (defined by each angle of α+β with respect to the center line X), and a pair of planar upper vibration dampening materials 14b, 14b interposed between the outer tray 12 (more specifically, the inclined sections 12b, 12c thereof) and the inner tray 13 (more specifically, the inclined sections 13b thereof) at the opposite end portions fixed by the screw 17 and the nut 18.

Figure 7:
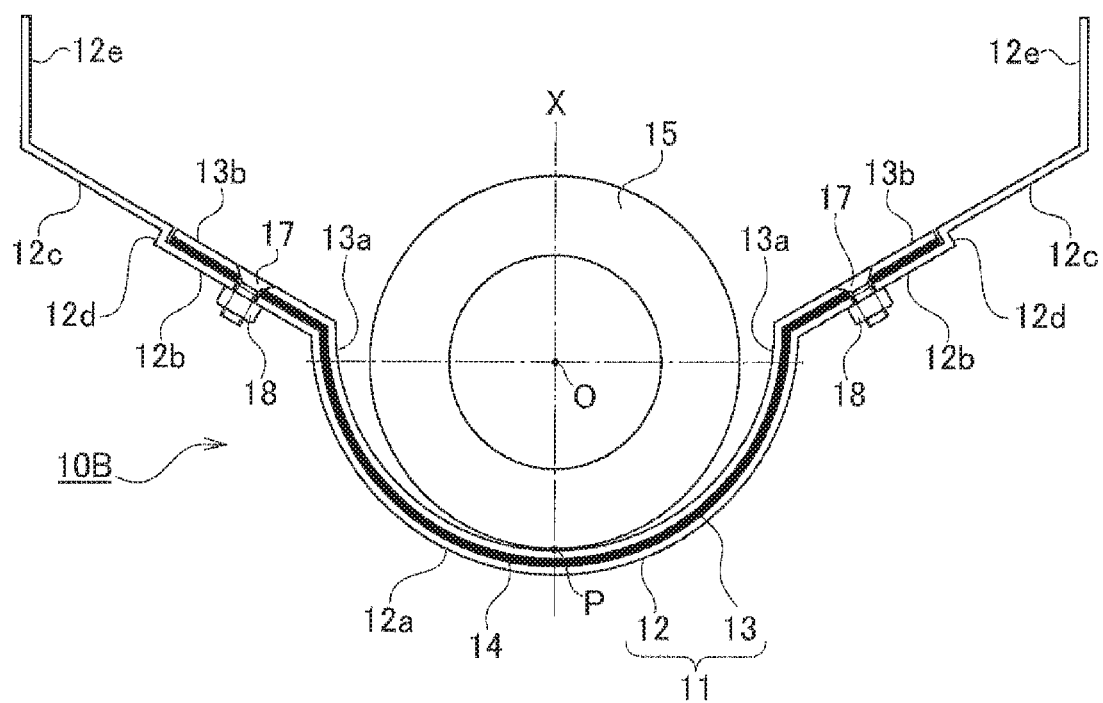
FIG. 7 a cross-section of a silent spiral conveyor according to another embodiment (Embodiment 4) of the present invention.

As will be described in reference to FIG. 7, even when the vibration dampening material 14 is designed to comprise the divided into the lower vibration dampening material 14a provided in a noise generation area (that is an area defined by each angle of α+β with respect to the center line X to include the rails 16, 16) and the upper vibration dampening materials 14b, 14b provided in the noise propagation areas (the fixed portions by the screw 17 and the nut 18), it is possible to achieve the silencing effect almost equal to the design of Embodiment 1 wherein the vibration dampening material 14 is continuous over the entire area including the noise generation area and the noise propagation area. Further, in this design wherein the vibration dampening material 14 is dividedly mounted for the respective areas, the vibration dampening materials 14a, 14b may easily be attached, detached and exchanged. It is also possible to exchange only the lower vibration dampening material 14a that would be easily abraded by direct contact with the conveyance spiral member 15.

Except for the above-described features, the spiral conveyor 10A according to Embodiment 3 has the same structure as the spiral conveyor 10 of Embodiment 1. The respective parts are identified by the same numerals as in the spiral conveyor 10 of Embodiment 1 and their explanation will be omitted. The operation and function are also the same and will not be described.

Embodiment 4

A spiral conveyor according to Embodiment 4 of the present invention will be described in reference to FIG. 7. This spiral conveyor 10B of Embodiment 4 has the structure similar to the spiral conveyor 10 of Embodiment 1 and also is common in that the vibration dampening material 14 is interposed between the outer tray 12 and the inner tray 13 over the entire areas. However, it has no rails 16, 16 on the inside of the inner tray 13.

The silencing effect achievable by the present invention will be described in reference to FIG. 8. An example A was prepared by using a NBR sheet having 1.5 mm thickness as the vibration dampening material 14, which was placed over the entire areas including the noise generation area and the noise propagation area as with Embodiment 1. An example B was prepared by using a vibration dampening and sound insulation material "IDIKELL (trademark) M-3000 made by Nihon Tokushu Toryo Co., Ltd. as the vibration dampening material 14, which was placed over the entire areas as with Embodiment 1. An example C was prepared by using the same NBR sheet having 1.5 mm thickness as the vibration dampening material 14 as with the example A, which was dividedly placed as the lower vibration dampening material 14a in the noise generation area and the upper vibration dampening materials 14b, 14b in the noise propagation areas as with Embodiment 3. An example D was prepared by using the same NBR sheet having 1.5 mm thickness as the vibration dampening material 14 as with the example A, wherein, however, the rails 16, 16 were omitted as with Embodiment 4. A comparative example was prepared by using a single tray 11 as with the prior art, which does not have the double-layered structure comprising the outer tray 12 and the inner tray 13. The curled continuous steel chip 5 was thrown, together with the water-soluble cutting fluid 7, into each spiral conveyor according to the examples A-D and the comparative example, which was driven at 50-60 rpm, and the noise level was measured at a point of 30 cm above the tray. The results are shown in FIG. 8.

Figure 8:
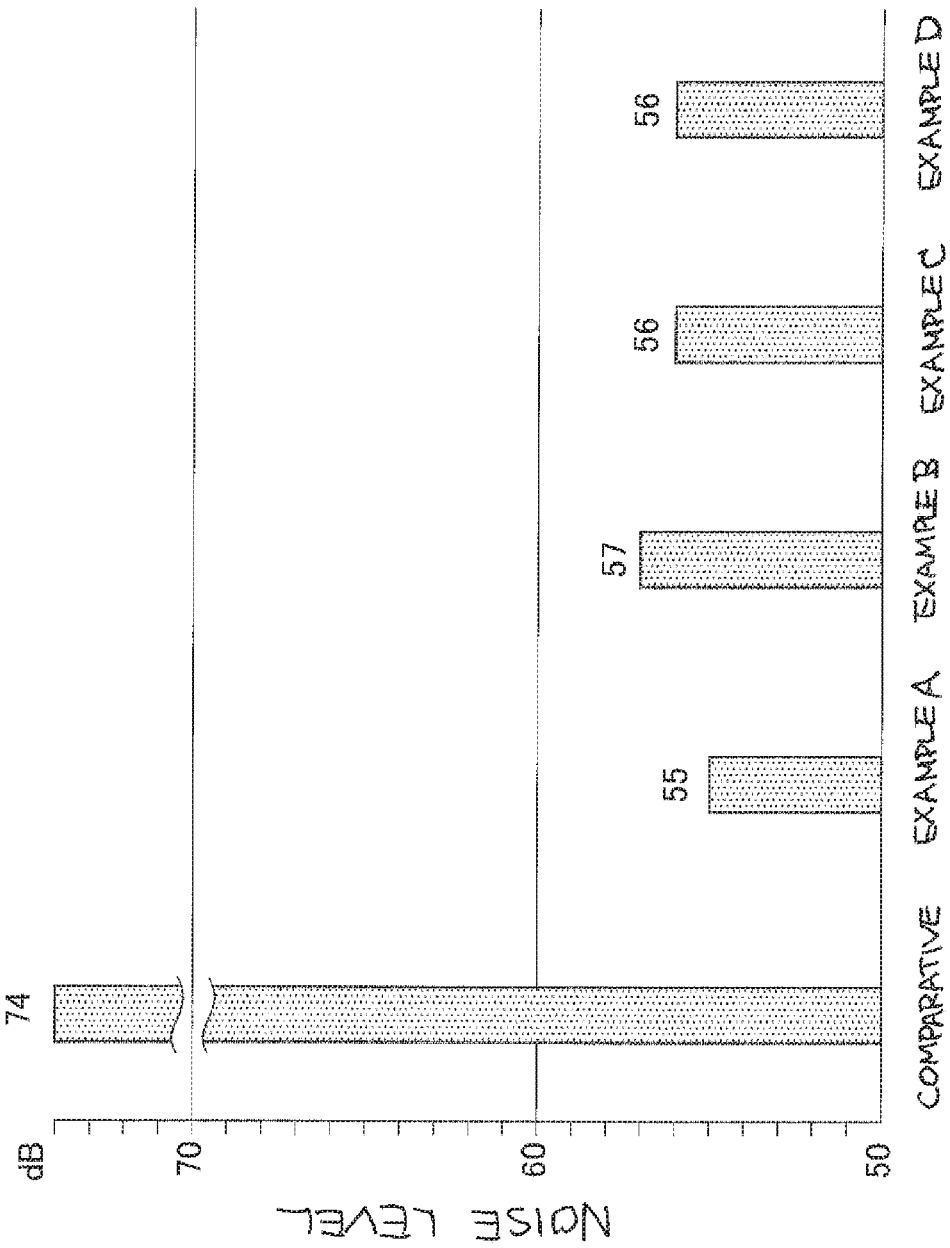
FIG. 8 a graph showing by comparison the silencing effect achievable by the present invention.

As shown in FIG. 8, from the conventional type spiral conveyor according to the comparative example was generated 74 dB noise, but the spiral conveyors according to the examples A and B wherein the vibration dampening material 14 was placed over the entire areas showed that the noise levels were drastically reduced to 55 dB and 57 dB, respectively, which will demonstrate a significant silencing effect. In comparison with the example A wherein the vibration dampening material 14 was placed over the entire areas and the generated noise level was 55 dB, the example C wherein the vibration dampening material 14 of the same material and the same thickness was dividedly placed showed the noise level of 56 dB, which shows no significant difference. This means that this example is also effective to drastically reduce the noise level when compared with the conventional type spiral conveyor according to the comparative example, showing a significant silencing effect as well. Even with the example D having no rails 16, 16, it was possible to achieve the silencing effect almost equal to that of the example A.

In a case where the spiral conveyor 10B has no rails 16, 16 as with Embodiment 4 (the example D), the conveyance spiral member 15 becomes in contact with the inner tray 13 in an area centered at the lowest point P on the center line X. Accordingly, when taking into consideration the comparative test results in FIG. 8 between Embodiment 1 (the examples A and B) and Embodiment 3 (the example C), it would be possible that, rather than using the vibration material 14 covering the entire areas as shown in FIG. 7, the vibration dampening material is divided into the lower vibration dampening material 14a placed in an area over a predetermined angle including the lowest point P as the center (the noise generation area) and the upper vibration dampening materials 14b, 14b placed in the portion fixed by the screw 17 and the nut 18 (the noise propagation area). It can be assumed that, even with such design, the noise level could be lowered to be almost equal to that of the example D.

Embodiment 5

Figure 9:
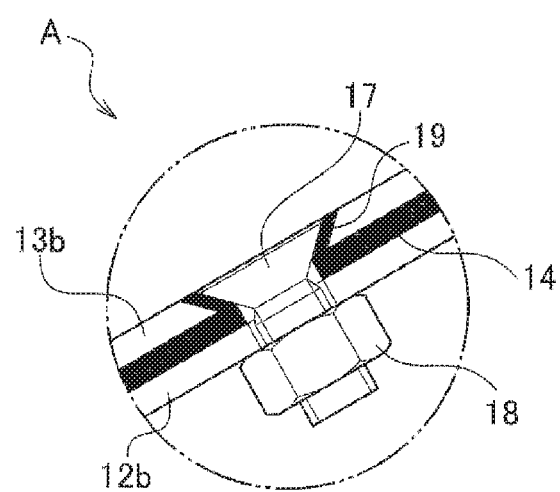
FIG. 9 an enlarged view showing a fixed portion (A portion in FIG. 2) of the silent spiral conveyor according to another embodiment (Embodiment 5) of the present invention.

A spiral conveyor according to Embodiment 5 of the present invention will be described in reference to FIG. 9. This spiral conveyor 10 of Embodiment 5 is a variation of the spiral conveyor 10 of Embodiment 1, wherein another vibration dampening material 19 is adhered to the lower surface of the countersunk head screw 17, at the fixed portion (A portion in FIG. 2) where the inner tray 13 is fixed to the outer tray 12 with the vibration dampening material 14 being interposed therebetween. When the inner tray 13 is fixed by the countersunk head screw 17 and the nut 18 to the outer tray 12 with the vibration dampening material 14 being interposed therebetween, the lower end of the vibration dampening material 19 becomes in close contact with the vibration dampening material 14 to form a continuous one.

When the countersunk head screw 17 and the nut 18, both being made from metallic material in general, should be in direct contact with the inner tray 13, vibration of the inner tray 13 is transmitted to the outer tray 12 via the the contact point, which could degrade the silencing effect. In Embodiment 5, the vibration dampening material 19 is adhered to (or a vibration dampening coating material is applied to) the countersunk head screw 17 for preventing the countersunk head screw 17 from being contact with the inner tray 13. The vibration dampening material 19 may be one similar to the vibration dampening material 14, which may be achieved by adhering a sheet-like vibration dampening material or coating a vibration dampening coating material.

By adopting such design, even at the fixed position where the inner tray 13 is connected to the outer tray 12 by means of the screw 17 and the nut 18, the vibration dampening material 19 will prevent vibration of the inner tray 13 from being transmitted to the outer tray 12, thereby further improving the silencing effect, in cooperation with the vibration dampening material 14 between the inner tray 13 and the outer tray 12.

LEGENDS

1 spiral conveyor
2 tray
3 conveyance spiral member
4 motor with deceleration mechanism
5 chips
6 discharge duct
7 cutting fluid
8 cutting fluid tank
10, 10A, 10B silent spiral conveyor
11 tray
12 outer tray
12a semi-circular cylindrical section
12b, 12c inclined section
12d bent step section
12e vertical section
13 inner tray
13a semi-circular cylindrical section
13b inclined section
14 vibration dampening material (first vibration dampening material)
14a lower vibration dampening material
14b upper vibration dampening material
15 conveyance spiral member
16 rail
17 screw (countersunk head screw)
18 nut
19 vibration dampening material (second vibration dampening material)
20 spiral conveyor
21 tray
22 outer tray
22a semi-circular cylindrical section
22b inclined section.
22c vertical section
23 inner tray
23a semi-circular cylindrical section
23b inclined section
24 vibration dampening material (first vibration damping material)
25 conveyance spiral member
26 rail
27 screw
28 nut
29 fastening means
30 presser plate
31 vibration dampening material (second vibration dampening material)

The invention claimed is:

1. A silent spiral conveyor wherein a coil-spring like conveyance spiral member is received in a tray and driven by a drive means such as a motor with a deceleration mechanism to be rotated at a low speed in a predetermined direction, thereby conveying chips thrown into said tray in a predetermined direction within said tray, said tray comprising:
    an outer tray,
    an inner tray placed inside of said outer tray with a gap therebetween,
    a first vibration dampening material interposed in the gap between said outer tray and said inner tray, and
    fixing means for detachably attaching said inner tray and the opposite ends of said first vibration dampening material to said outer tray.
2. The silent spiral conveyor according to claim 1, wherein said first vibration dampening material extends continuously between said outer tray and said inner tray, over substantially the entire areas including the opposite end portions thereof fixed by said fixing means.

3. The silent spiral conveyor according to claim 1, further comprising:
- a pair of projecting rails extend in a direction of conveyance at two opposite-angle positions with respect to a center line of said inner tray for substantially supporting said conveyance spiral member, said first vibration dampening material being divided into an arcuate lower vibration dampening material interposed between said outer tray and said inner tray over an area covering the center line and said rails, and
- a pair of planar upper vibration dampening materials interposed between said outer tray and said inner tray at the opposite end portions thereof attached by said fixing means.

4. The silent spiral conveyor according to claim 1, wherein said fixing means comprises a second vibration dampening material for preventing vibration of said inner tray from being transmitted to said outer tray, when it combines integrally said outer tray and said inner tray with each other with said first vibration dampening material being interposed therebetween.

5. The silent spiral conveyor according to claim 4, wherein said fixing means comprises a screw extending successively through said outer tray, said first vibration dampening material and said inner tray, and a nut that fastens said screw outside of said outer tray, wherein said second vibration dampening material is disposed in an area of contact of said nut and said screw.

6. The silent spiral conveyor according to claim 1, wherein said fixing means comprises a presser plate having one end being fixed by a fastening means to said outer tray outside of the end portion of said inner tray, said presser plate operating as a leaf spring such that the end portion of said inner tray is inserted between a leading end of said presser plate and said outer tray for detachable mounting of said inner tray, and said second vibration dampening material is disposed between the leading end of said presser plate and the end portion of said inner tray.

* * * * *